No. 644,730. Patented Mar. 6, 1900.
S. COLT.
FLEXIBLE HUB FOR WHEELS.
(Application filed Aug. 4, 1899.)

(No Model.)

Witnesses.
Frank F. Flournoy.
John R. Bagley.

Inventor.
Samuel Colt.

UNITED STATES PATENT OFFICE.

SAMUEL COLT, OF SANTA BARBARA, CALIFORNIA.

FLEXIBLE HUB FOR WHEELS.

SPECIFICATION forming part of Letters Patent No. 644,730, dated March 6, 1900.

Application filed August 4, 1899. Serial No. 726,177. (No model.)

*To all whom it may concern:*

Be it known that I, SAMUEL COLT, a citizen of the United States, and a resident of Santa Barbara, in the county of Santa Barbara, State of California, have invented a new and useful Flexible Hub for Wheels, of which the following is a specification.

My improvement consists in causing a weight resting upon the axis of a hub to have elasticity or less rigidity. It is effected by the hub acting independently but in confined contact with the wheel, with springs placed between them (fastened in the hub) pressing against a flange fastened in the wheel. The hub and wheel are sustained in their relation to each other by a central flange fastened to the wheel extending into the hub and by two exterior flanges extending outwardly over each side of the hub, between which the hub has space to yield to the pressure of or on the springs. The central flange fastened to the wheel comes in contact with the entire surface of a circular spring fastened in the wheel, which is supported by a circular spring of spiral form. The hub is made in two parts, which when bolted together cover and hold in place the springs placed in a circular groove with space to allow the springs to yield to pressure.

The mechanism of the hub and wheel is illustrated by the accompanying drawings, in which—

Figure 1:
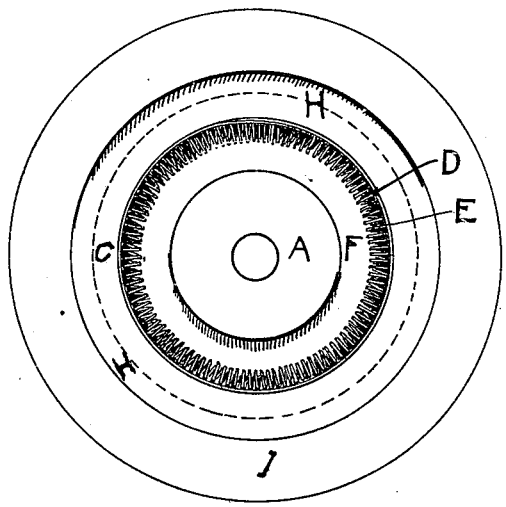
Figure 2:
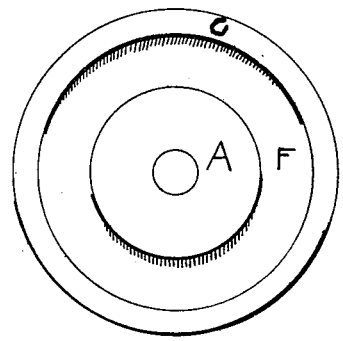
Figure 3:
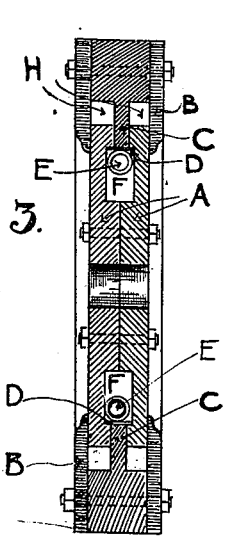
Figure 4:
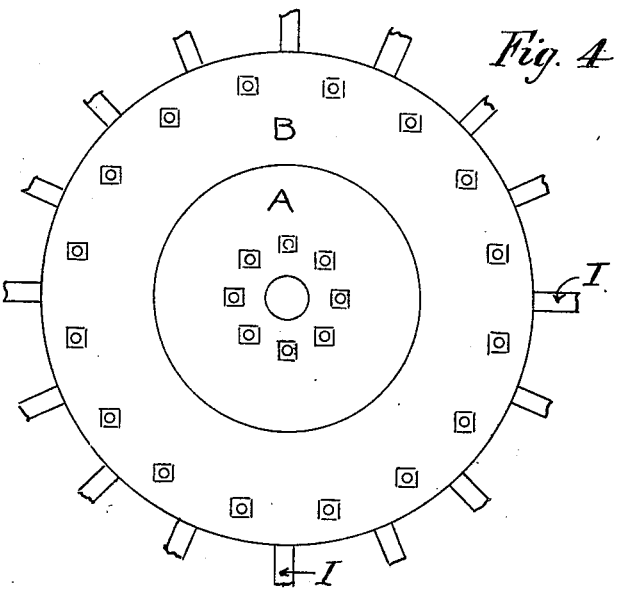

Figure 1 is a horizontal view of the hub A and wheel I, with one-half of the hub A and one exterior flange B removed, showing the central flange C in contact with the circular spring D, inclosing the spiral spring E in the circular groove F made in the hub A, also the circular space H in the wheel I, which permits the hub A to slide in the wheel I. Fig. 2 is a horizontal view of the hub A removed from its counterpart, showing the circular groove F, which holds the springs E and D in place when bolted in place. Fig. 3 is a view of an exterior flange B, fastened to the wheel I, which extends over the hub A; Fig. 4, a sectional view of hub A and wheel I, with the different parts in place and lettered according to the above description. Fig. 5 is an exterior view of wheel I and hub A.

Similar letters refer to similar parts throughout the specification.

I claim—

In the combination of a hub working independently of a wheel but held in firm relation to it, a central flange C sliding in the hub two exterior flanges B the circular groove F within the hub the circular spring D the circular spiral spring E the circular space between hub and wheel substantially as described and for the purpose specified.

SAMUEL COLT.

Witnesses:
W. H. WOODBRIDGE,
D. GREGORSON.